CHARACTER READER

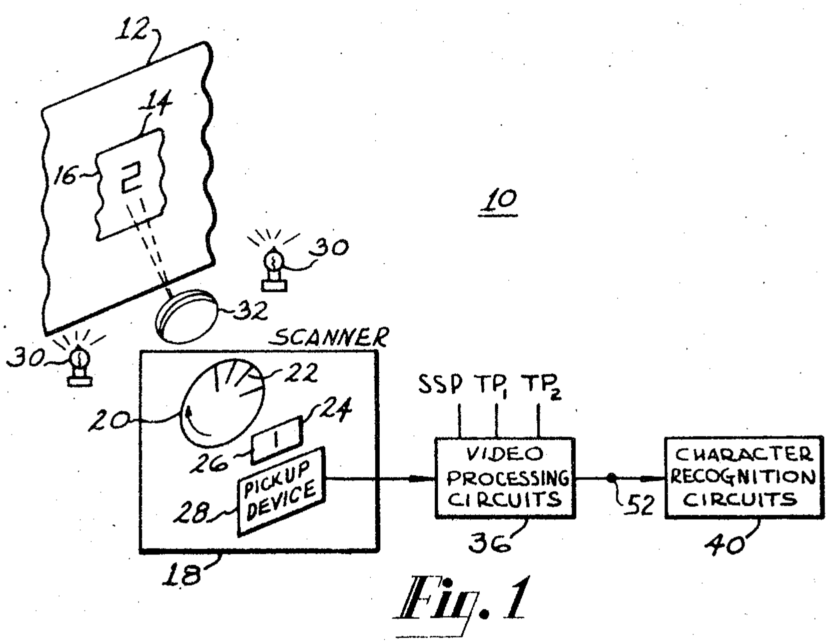
Fig. 1
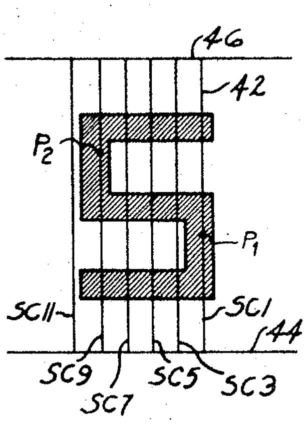
Fig. 2
TRUTH TABLE
| | SVR | SVC | SVL | LVR | LVC | LVL | SWG | RSH |
|---|---|---|---|---|---|---|---|---|
| 0 | | | | + | | + | − | |
| 1 | + | | − | | + | | − | |
| 1 | | − | − | + | | | − | |
| 2 | + | | + | − | − | − | + | + |
| 3 | | − | − | + | − | − | + | |
| 4 | | | + | | + | | − | |
| 4 | | + | | + | − | − | − | |
| 5 | + | | + | − | − | − | + | − |
| 6 | + | | | − | − | + | + | |
| 7 | + | + | | − | − | − | | + |
| 8 | | − | | + | − | + | + | |
| 9 | | | + | + | − | − | + | − |
Fig. 4
INVENTORS
BERNARD P. SILVERMAN &
HAROLD B. CURRIE
John V. Regan
ATTORNEY

Filed Jan. 8, 1965 3 Sheets-Sheet 2

INVENTORS
BERNARD P. SILVERMAN &
HAROLD B. CURRIE
BY
John V. Regan
ATTORNEY

CHARACTER READER

Filed Jan. 8, 1965

3 Sheets-Sheet 3

INVENTORS
BERNARD P. SILVERMAN &
HAROLD B. CURRIE
BY John V. Regan
ATTORNEY

United States Patent Office 3,465,288
Patented Sept. 2, 1969

3,465,288
CHARACTER READER

Bernard P. Silverman, Moorestown, and Harold B. Currie, Gibbsboro, N.J., assignors to RCA Corporation, a corporation of Delaware Filed Jan. 8, 1965, Ser. No. 424,286
Int. Cl. G06k 9/02
U.S. Cl. 340—146.3 6 Claims

ABSTRACT OF THE DISCLOSURE

A character reader relies on the detection of vertical strokes in a character and the relative positions of these vertical strokes within the character to recognize the character.

Certain character readers operate to scan characters printed on a document and recognize the characters by the distinctive sets of video signals produced when different characters are scanned. The character reader then translates the signals representing the recognized characters into a digitalized code for storing in a storage medium or for processing by a computer.

The characters to be read from a document may, for example, be printed by a computer-operated high speed printer of the drum type or the like. In a drum printer, complete characters are formed on type bars and the bars are selectively energized to strike an inked ribbon so as to produce inked impressions of the characters on a document being printed. Such high speed printers frequently print a distorted version of the character. For example, either the top or the bottom portions of the character may not be printed at all due to the high rotational speed of the drum.

One way of recognizing such distorted characters is to predicate recognition on the reliable features contained in the outline trace of the distorted characters. The reliable features in such distorted characters are primarily the vertical strokes of the characters. Vertical strokes are rarely omitted in their entirety when the characters are printed. Furthermore, a stylized font, such as a matchstick font, may be utilized in the printing of the characters to emphasize the vertical strokes in the character. A matchstick font is particularly suitable for printing numeric characters and therefore such character readers are primarily numeric character readers.

In one character reader for reading distorted characters, the characters are differentiated from each other by dividing each character into both horizontal and vertical zones and detecting in which zones the vertical strokes of the character occur. Vertical strokes of different characters occur in different combinations of zones. For example, the numeral 2 from a matchstick font includes an upper-right vertical stroke and a lower-left vertical stroke. The numeral 5 includes a lower-right vertical stroke and an upper-left vertical stroke. The numeral 7 includes a lower-center stroke, etc. It is relatively easy to effectively divide a character into a plurality of vertical zones. However, it is more difficult to divide a character horizontally, i.e. from top to bottom or vice versa, because each scanline of video signals from the scanner must be carefully synchronized with the zoning circuits. Such synchronization usually requires a timing or clock oscillator which is actuated by the scanner and a counter which is coupled to count the oscillatory pulses so as to divide each scanline into zones. Such a synchronizer accurately zones a character when an electronic scanner is utilized in the prior character reader. However, when a mechanical disc scanner of the Nipkow type is utilized in place of an electronic scanner, the synchronization is less accurate because fluctuations in the speed of the motor rotating the disc tend to vary the scanning rate for different lines. The present character reader is adapted to recognize characters, including distorted ones, when either electronic or mechanical scanning systems are utilized and without requiring synchronization of each scanline. Thus, the present character reader is not only more accurate but also is less expensive than prior art character readers.

It is an object of this invention to provide a relatively inexpensive character reader capable of reading distorted characters.

It is another object of this invention to provide an improved character reader which reads characters accurately without the necessity of utilizing a scanline synchronizer.

It is a further object of this invention to provide an improved character recognition system for use with a mechanical scanning system.

A character reader in accordance with the invention avoids the problem of horizontal zoning and synchronization by dividing a character into right, center, and left vertical zones and detecting the size (but not vertical position) of each vertical stroke that occurs in each vertical zone. In order to differentiate between a numeral 2 and a numeral 5 from a matchstick font the character reader also analogically measures the difference in distance from a fixed reference point of the vertical stroke in the right zone of a character as compared with a vertical stroke in another zone of the character. Finally, the white gap between horizontal strokes is also measured to aid in the recognition of the characters.

In the drawings:

FIGURE 1 is a schematic block diagram of a character reading system embodying the invention;

FIGURE 2 is a diagrammatic illustration of the scanning of an individual character in the character reader of FIGURE 1;

Figure 3A:
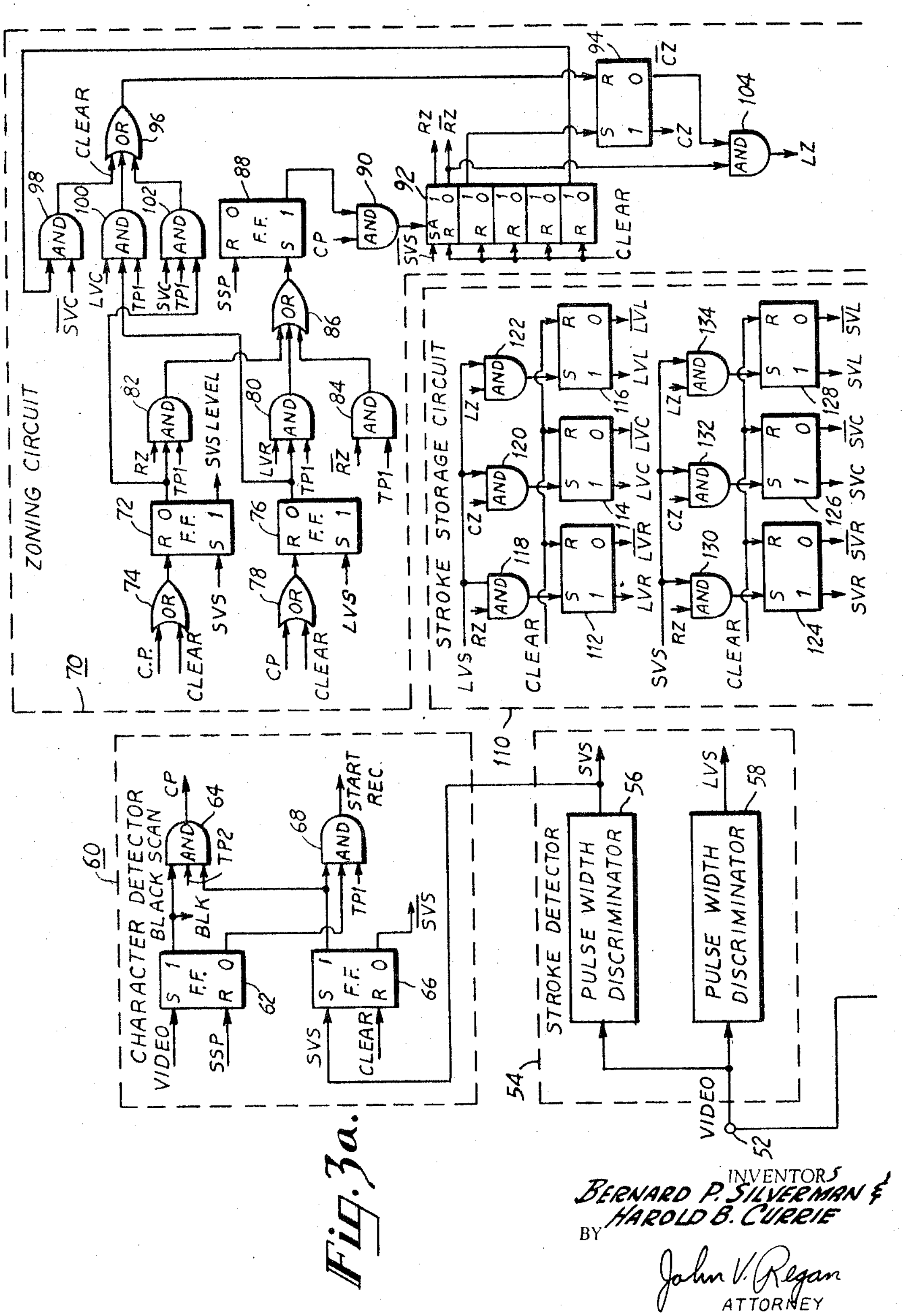
Figure 3B:
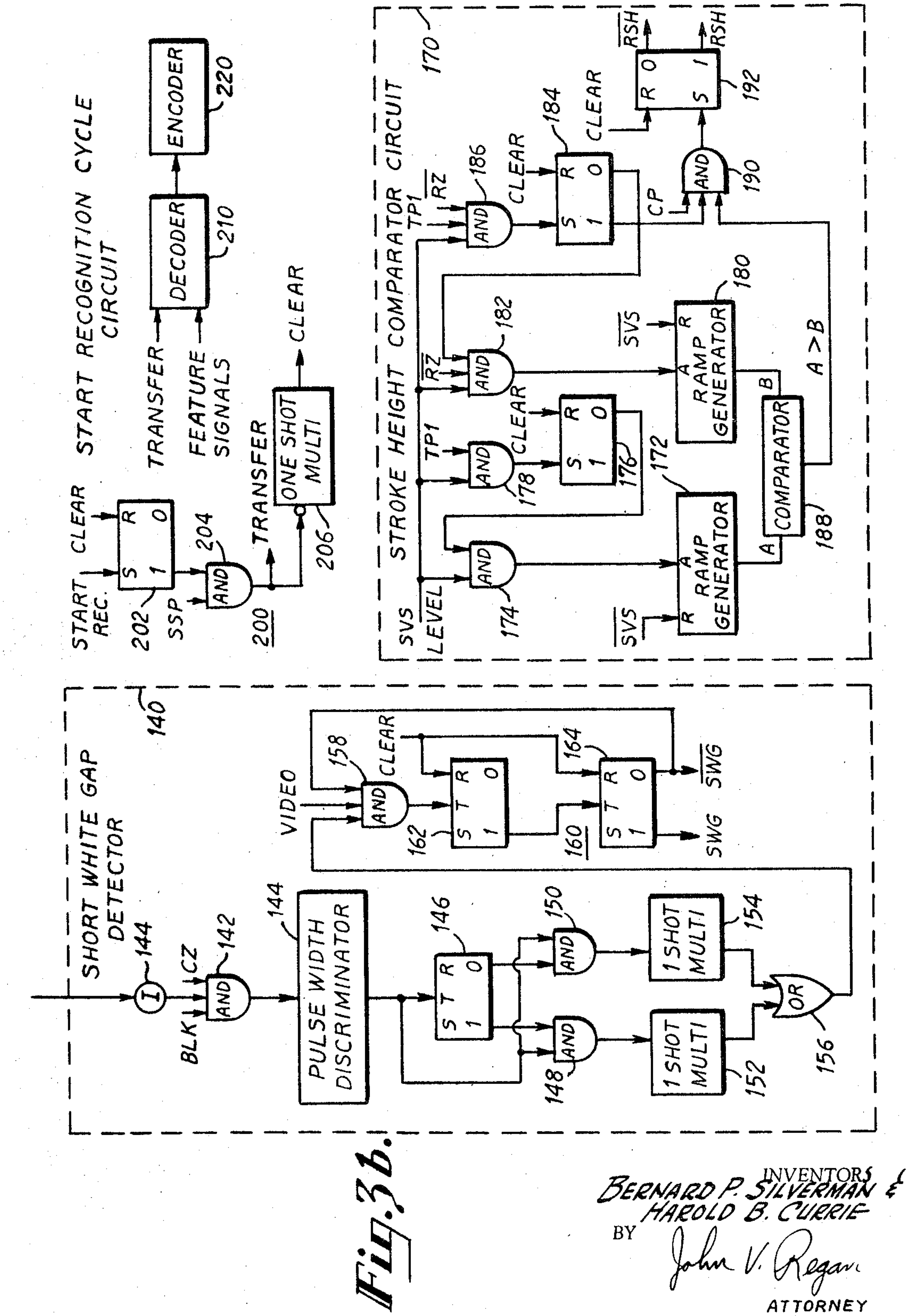

FIGURE 3, which includes FIGURES 3*a* and 3*b*, is a schematic block diagram of a character recognition system embodying the invention; and, FIGURE 4 is a Truth Table utilized in recognizing characters by the recognition system of FIGURE 3.

General

Referring now to FIGURE 1, a schematic block diagram of a character reading system 10 is illustrated. The system includes a transport mechanism or document handling device 12 for transporting a document 14 having characters 16 printed thereon. The transport mechanism 12 moves the document 14 at a substantially constant velocity in the direction of the arrow shown thereon past the front of a scanner 18. The scanner 18 may, for example, comprise a mechanical scanning system of the Nipkow type and includes a disc 20 having a plurality of radial slits 22 formed around the periphery thereof. A plate 24 having a single slit 26 is fixedly mounted between the disc 20 an an electro-optical pickup device 28. The pickup device 28 may, for example, comprise a solar cell. Light emanating from the lamps 30 is reflected from the document 14 and focused by an optical lens system, shown schematically as a single convex lens 32, onto the disc 20. The disc 20 is rotated in the direction of the arrow shown thereon and the slits 22 pass the light focused by the lens 32. The rotating slits 22 and the fixed slit 24 in conjunction create a moving aperture which effectively traverses the character 16 from bottom to top in a scanline slice. The scanline scans from bottom to top because of the image inverting characteristic of the lens 32. Each rotating slit 22 creates a new scanline and the movement of the transport mechanism 12 causes each character 16 on one line of the document 14 to be scanned by a plurality of vertical scanlines in a raster type scanning. The scanner 18 provides one dimension of the raster, i.e., the vertical, whereas the movement of the document 14 by the transport mechanism 12 provides the other dimension, i.e., the horizontal. The pickup device 28 responds to the variations in dark and light caused by the scanlines traversing the outline traces of the characters by generating a series of voltage pulses which represent the features present in the characters 16.

Th video signals are applied to a video processing circuit 36 which processes the video signals to provide uniform amplitude pulses having fast rise and fall times. The circuit 36 also provides a start scan pulse generated at the start of a scan and two timing pulses $TP_1$ and $TP_2$ generated in succession a the end of a scan. The processed video signals are applied to a character recognition system 40, wherein the video signals are recognized as particular characters and encoded in to a digitalized form, such as a binary coded form.

Character scanning

In FIGURE 2 is shown the manner in which an individual character, the numeral 5, is scanned by the scanner 18. A character is scanned vertically from bottom to top while the character is simultaneously moved from left to right by the transport mechanism 12. Thus, each character is scanned both orthogonally and successively by a plurality of substantially vertical scanlines 42 that commence at the right and end at the left of the character. Other scanning patterns, of course, may be utilized if desired. The scanning may commence at the left and end at the right of a character, of course. However, in reading numeric characters, it is preferred to first scan the least significant digit to permit ease of adding numeric characters in an output computer. Each scanline 42 commences near a line 44 toward the bottom of the document 14 and ends near a terminal line 46 above the character and toward the top of the document. Each character is therefore appreciably overscanned to provide for any misalignment in the printing of the characters. Each character from a 5 x 7 font style is formed such that a scanline normally takes fourteen intervals of 16 microseconds each to traverse the character from bottom to top. Such an interval will be referred to as an element. For purposes of convenience through the specification, elements wil be utilized to measure time as well as distance.

A normal length character is fourteen elements high. A horizontal stroke in such a character is two elements high and the short white gap between such horizontal strokes is four elements high. A short vertical stroke (SVS) is normally eight elements high but the recognition circuit 40 defines any video pulse at least five elements wide as a short vertical stroke. Similarly, a video pulse at least eleven elements wide is defined as a long vertical stroke.

Abbreviations utilized in the drawings are listed below.

Abbreviations

SSP=start scan pulse
$TP_1$=first end of scan timing pulse
$TP_2$=second end of scan timing pulse
RZ=right zone
CZ=center zone
LZ=left zone
SVS=short vertical stroke
LVS=long vertical stroke
SWG=short white gap
CP=character present
RSH=right stroke higher
LVRS=long vertical right stroke
LVCS=long vertical center stroke
LVLS=long vertical left stroke
SVRS=short vertical right stroke
SVCS=short vertical center stroke
SVLS=short vertical left stroke The inverse (i.e., absence) of the above signals is designated by a bar over the above abbreviations.

Detailed description

In FIGURE 3, comprising FIGURES 3*a* and 3*b*, one exemplification of a character recognition circuit 40 embodying the invention is shown. Video signals from the processing circuit 36 are applied to an input terminal 52 of the character recognition circuits 40. The video signals are applied asynchronously in that no timing oscillator is utilized to clock these signals into the resognition circuits 40. Although the raw video signals are digitized by amplitude (i.e., quantized), they are not digitized by time (i.e., synchronized). Thus, the video signals applied to the terminal 52 are essentially analog rather than digital signals in that the video pulses are random in length. The video signals from the terminal input 52 are applied to a stroke detector 54 (FIGURE 3*a*) which detects vertical strokes in the video signals. The stroke detector 54 includes a pair of pulse width discriminators 56 and 58 which detect short vertical strokes (SVS) and long vertical strokes (LVS), respectively. The pulse width discriminator 56 produces an output signal when the video pulse applied thereto exceeds a predetermined duration, e.g., 80 microseconds. This is equivalent to five elements and therefore the discriminator 56 detects and defines a short vertical stroke as at least five elements high. The pulse width discriminator 58 produces an output signal when the duration of a video pulse applied thereto exceeds 176 microseconds. This is equivalent to eleven elements and therefore the discriminator 58 detects and defines a long vertical stroke as at least eleven elements high.

Video signals from the input terminal 52 as well as a short vertical stroke (SVS) signal from the pulse width discriminator 56 are applied to a character detector circuit 60. The character detector 60 detects when a character arrives in the scannig area and when it leaves. The character detector circuit 60 includes a flip-flop 62 which is reset at the start of every scan by a start scan pulse (SSP) applied from the video processing circuits 36 to the reset terminal R thereof. The flip-flop 62 is set by black video signals applied from the input terminal 52 to the set input terminal S of the flip-flop. The term "black video signals" signifies the video pulses resulting from the traversal of the outline trace of a character by a scanline. When the scanline is not traversing the character, the video signals are termed "white video signals." An output from the "1" output terminal of the flip-flop 62 denotes that a scan contained black video signals and the output is applied as one input to an AND gate 64. The other inputs to the AND gate 64 comprise a timing pulse ($TP_2$) derived from the video processing circuit 36 at the end of every scan and a signal derived from the "1" output terminal of a flip-flop 66 denoting that a vertical stroke has been detected. The flip-flop 66 is set by a short vertical stroke signal applied from the pulse width discriminator 56 to the set terminal S of the flip-flop and is reset by a clear pulse. The clear pulse is a general reset pulse for the recognition circuits 40. The origin of the clear pulse will be described later. The "1" output terminal of the flip-flop 66 is coupled as one input to an AND gate 68 in the circuit 60. The other inputs to the AND gate 68 comprise a timing pulse $TP_1$ derived from the video processing circuits 36 at the end of every scan and a signal from the "0" output terminal of the flip-flop 62. The AND gate 68 produces an output signal at the end of any scan that contains only white video signals and that occurs after a short vertical stroke had been detected in a previous scan. This output signal denotes that the end of the character has arrived and a start recognition (start rec.) signal is produced. On the other hand, the AND gate 64 in the circuit 60 produces a character presence (CP) signal at the end of every scan in which black video occurs and subsequent to the detection of a short vertical stroke. This effectively defines the presence of a character because in the matchstick font every character but the numeral 4 includes a vertical stroke at the extreme right side thereof.

The character presence signal from the circuit 60 is applied to a zoning circuit 70. The zoning circuit 70 effectively divides each of the characters being read into right, center and left vertical zones in that order. The right zone of a character is evidenced by the presence of a vertical stroke at the right end of the character. The right zone ends after the absence of the vertical stroke is noted and then the center zone of a character begins. If no vertical stroke is detected in the center zone, the center zone comprises three vertical scans. If a center vertical stroke is detected, the center zone ends when the absence of the stroke is noted. The left zone of a character comprises the remaining scans until the end of the character is detected. It is to be noted that this vertical zoning of a character is an asynchronous type of zoning. The width of the zones in terms of number of scanlines is based on data extracted from the characters rather than on a fixed count of scanlines. In a normal character, ten scans are usually required to completely scan the character.

The zoning circuit 70 includes a flip-flop 72 which is set upon the detection of a short vertical stroke. The flip-flop 72 is set by a short vertical stroke signal from the pulse width discriminator 56 and reset either by a clear pulse or a character presence (CP) signal which are applied through an OR gate 74 to the reset terminal R of the flip-flop. The zoning circuit 70 also includes a flip-flop 76 which is set upon the detection of a long vertical stroke. The flip-flop 76 is set by a long vertical stroke signal derived from the pulse width discriminator 58 and is reset by a clear pulse or a character presence (CP) signal applied through an OR gate 78. The "0" output terminal of the flip-flop 76 is coupled as one input to an AND gate 80. The other inputs to the AND gate 80 comprise a timing pulse $TP_1$ generated at the end of every scan and a long vertical right (LVR) stroke signal, the origin of which will be described subsequently. Similarly, the "0" output terminal of the flip-flop 72 is coupled as one input to an AND gate 82. The other inputs to the gate 82 comprise a timing pulse $TP_1$ and a right zone (RZ) signal, the origin of which will be described subsequently. The AND gates 80 and 82 produce output signals at the end of a scan of a character in which no vertical stroke is detected. A third AND gate 84 has a timing pulse $TP_1$ applied as one input thereto as well as a signal denoting the right zone of a character has ended, i.e., $\overline{RZ}$. Therefore, the AND gate 84 produces an output signal at the end of every scan after scanning of a right zone is completed. All of the outputs of the AND gates 80, 82 and 84 are coupled through an OR gate 86 to the set terminal of a flip-flop 88. The flip-flop 88 is reset at the start of every scan by a start scan pulse (SSP). The "1" output terminal of the flip-flop 88 as well as a character presence (CP) signal from the character detector 60 are applied to an AND gate 90, the output of which is coupled to the advance terminal A of a shift register counter 92. The shift register counter 92 includes a plurality of flip-flop circuits interconnected to form a five-stage shift register. All of the stages of the shift register 92 are reset by a clear pulse which is applied to the reset terminal of the flip-flop in each stage. The first stage of the register is then set to store a "1" by a signal ($\overline{SVS}$) derived from the "0" output terminal of the flip-flop 66 in the character detector 60. The setting of the first stage flip-flop provides a right zone ($\overline{RZ}$) signal from the "1" output terminal thereof. The resetting of this stage produces a not right zone (RZ) signal from the "0" output terminal thereof. The "1" output terminal of the second stage of the register 92 is coupled to the set terminal S of a flip-flop 94. The setting of the flip-flop 94 produces a signal from the "1" output terminal thereof which denotes that the center zone (CZ) of a character is being scanned. Thus, the register 92 is advanced by the AND gate 90 from the first to the second stage thereof at the end of any scan in the right zone in which no vertical stroke is detected.

The flip-flop 94 is reset to denote that the end of the center zone occurred by a signal derived from an OR gate 96. The OR gate 96 has applied thereto a plurality of signals derived from AND gates 98, 100 and 102 as well as a clear pulse signal. The AND gate 98 produces an output when the shift register 92 has advanced to the last stage thereof and no short vertical center ($\overline{SVC}$) stroke has been detected. In the center zone of a character, the initial "1" in the first stage of the shift register 92 is advanced or shifted one position at the end of every scan if no vertical stroke occurs. At the end of the center zone, the "1" output terminal of the last stage in the register 92 is high and activates the AND gate 98 to reset the flip-flop 94 to switch out of the center zone. The AND gate 100 has applied thereto a long vertical center (LVC) stroke signal, a signal derived from the "0" output terminal of the flip-flop 76, and a timing pulse $TP_1$. Thus, the AND gate 100 produces an output when a long vertical center stroke signal has been previously detected but no long vertical stroke is detected in the present scanline. The AND gate 102 performs the same function for a short vertical center stroke. Thus, a short vertical center (SVC) stroke signal is applied to the AND gate 102 along with a signal from the "0" output terminal of the flip-flop 72 and an end of scan timing pulse $TP_1$. The output of any one of the output gates 98, 100 and 102 causes the resetting of the flip-flop 94 and causes the production of a left zone signal. The "0" output terminal of the flip-flop 94 as well as the "0" output terminal of the first stage of the shift register 92 are coupled to an AND gate 104 which produces a left zone (LZ) signal when both these flip-flops are reset.

The signals from the zoning circuits 70 as well as the output signals from the stroke detector 54 are applied to a stroke storage circuit 110 which stores indications of the detection of vertical strokes in a character. The stroke storage circuit 110 includes a first tier of flip-flops 112, 114 and 116 which store indications of the detection of a long vertical right (LVR) stroke, a long vertical center (LVC) stroke, and a long vertical left (LVL) stroke, respectively. Each of the flip-flops 112, 114 and 116 are initially reset by a clear pulse and are set by a signal from one of the AND gates 118, 120 and 122, respectively. Each of the AND gates 118, 120 and 122 has a long vertical stroke (LVS) signal from the pulse discriminator 58 applied to the one input thereto. The AND gate 118 also has applied thereto a right zone (RZ) signal from the zoning circuits 70 whereas the AND gates 120 and 122 have applied thereto center zone (CZ) and left zone (LZ) signals, respectively.

The stroke storage circuit 110 also includes a second tier of flip-flops 124, 126 and 128 which store indications of the detection of short vertical strokes in the right, center and left zones, respectively. The flip-flops 124, 126 and 128 are all reset initially by a clear pulse and are set respectively by signals derived from AND gates 130, 132 and 134. The AND gates 130, 132 and 134 are activated when a short vertical stroke is detected in the pulse width discriminator 56 and a right zone (RZ), a center zone (CZ) or a left zone (LZ) signal is applied, respectively, to these gates.

Referring now to FIGURE 3*b*, the character recognition circuits 40 also include a short white gap detector 140. The detector 140 detects the white gaps in the center zone between horizontal strokes in a character. The detector 140 includes an input AND gate 142 which has one input thereof coupled through an inverter 144 from the video input terminal 52 of the recognition circuits 40. The inverter 144 produces a positive-going signal at the end of every black video signal applied to the terminal 52. The second input to the AND gate 142 is the BLK signal derived from the "1" output terminal of the flip-flop 62 in the character detector circuit 60. The signal denotes that black video (BLK) signals were detected in a scanline. The last input to the AND gate 142 comprises a center zone (CZ) signal from the zoning circuit 70. Thus, the AND gate 142 is activated in the center zone of a character at the end of a black video pulse or signal. This may be at the termination of a horizontal stroke. The output of the AND gate 142 is coupled to a pulse width discriminator 144. The pulse width discriminator 144 produces an output signal at the end of 32 microseconds. The output signal therefore occurs after scanning two elements of the white gap following a horizontal stroke. The output signal is applied to the trigger terminal T of a triggerable flip-flop 146 which triggers on the trailing edge of the output signal. The output signals is also applied to each of a pair of AND gates 148 and 150. The other inputs of the AND gates 148 and 150 are derived from the "1" and "0" output terminals of the flip-flop 146. The AND gates 148 and 150 are therefore activated on each triggering of the pulse width discriminator 144. The output of the AND gates 148 and 150 are applied to one-shot multivibrators 152 and 154, respectively. Each of the multivibrators 152 and 154 produces a pulse having a duration of 64 microseconds or four elements long. The one-shot multivibrators 152 and 154 are coupled through an OR gate 156 to one input of an AND gate 158. The other input to the AND gate 158 is derived from the input terminal 52 of the character recognition circuits 40 and from a two-stage counter 160. The counter 160 comprises a pair of triggerable flip-flops 162 and 164 which are each reset by a clear pulse. The output of the AND gate 158 is coupled to the trigger terminal T of the flip-flop 162 and one output terminal of this flip-flop is in turn coupled to the trigger terminal T of the second flip-flop 164. Each flip-flop is triggered by a negative-going signal or the trailing edge of an input video pulse. The output from the "1" output terminal of the second flip-flop 164 denotes the detection of a short white gap.

When the trailing edge of a horizontal stroke is detected by the AND gate 142, the pulse width discriminator 144 waits until the scanline has traversed halfway to the next horizontal stroke before this discriminator produces an output pulse. The output pulse activates one of the AND gates 158 or 150 which in turn activates one of the multivibrators 152 or 154, respectively, to produce a pulse having a duration of four elements. If, during this four-element duration time, black video signals occur then the AND gate 158 is activated. Such black video signals may be due to crossing another horizontal stroke. When the AND gate 158 output goes low, the flip-flop 162 is triggered to the set state. A second horizontal stroke detected in a character triggers the flip-flop 162 to the reset state producing a negative-going signal at the "1" output terminal thereof. This latter signal sets the flip-flop 164 to produce a short white gap signal from the "1" output terminal thereof. The setting of the flip-flop 164 disables the AND gate 158. It is to be noted that a short white gap can be detected in one scan if three horizontal strokes occur in a character, or in two scans if a character is distorted enough to have one horizontal stroke missing.

The recognition circuits 40 also include a stroke height comparator circuit 170. The stroke comparator circuit 170 detects whether a right vertical stroke in a character is higher than the remaining strokes in this character and produces a feature signal signalling this detection. Such a circuit is primarily utilized to differentiate between a numeral 5 and a numeral 2 in a matchstick font because these characters are mirror images of each other and the detection of the size of the vertical strokes alone does not differentiate these characters. The comparator circuit 170 makes an analog measurement of the distance from the point of detection of a right zone vertical stroke until the end of the scan in which the stroke is detected. This distance is compared with a similar analog measurement for a stroke in either the center or left zones and a signal denoting which stroke is higher is produced. Thus, by an analog method, a vertical measurement is made and this measurement does not require the scanlines to be vertically divided. This azonal vertical measurement is accurate to indicate the vertical positioning of the desired vertical strokes.

The comparator circuit 170 includes a first ramp generator 172 which is triggered to "rundown" from a high level output to a low level output by a signal derived from an AND gate 174. The ramp generator is reset to the high level by the $\overline{SVS}$ signal derived from the "0" output terminal of the flip-flop 66 in the character detector circuits 60. One input to the AND gate 174 is the SVS signal derived from the "1" output terminal of the flip-flop 72 in the zoning circuits 70 (FIGURE 3*a*). It is to be recalled that the detection of a short vertical stroke sets this flip-flop. The other input to the AND gate 174 comprises the "0" output signal of a flip-flop 176. The flip-flop 176 is initially reset by a clear pulse to enable the AND gate 174 which in turn is actuated to produce an output signal when a short vertical stroke is detected in a scanline. The flip-flop 176 is set to deactivate the AND gate 174 by an output signal from an AND gate 178. The input to the AND gate 178 comprises the short vertical stroke level signal from the flip-flop 72 as well as an end of scan timing pulse $TP_1$. Thus, the ramp generator is triggered to run by the detection of a short vertical stroke in a scanline and the generator 172 runs until the end of the scanline in which the short vertical stroke is detected. The ramp generator 172 initially exhibits a voltage of a predetermined level and the running thereof decreases the voltage in a direction toward zero. The ramp generator 172 analogically measures the distance from the point of detection of a stroke to the end of the scanline in which the stroke occurs. The comparator circuit 170 also includes a second ramp generator 180. The ramp generator 180 is also reset by the $\overline{SVS}$ signal, derived from the "0" output of the flip-flop 66 (FIGURE 3*b*), and is triggered to "rundown" by the output of an AND gate 182. The AND gate 182 is activated when not in the right zone of a character (i.e., $\overline{RZ}$) by the detection of a short vertical stroke signal in the flip-flop 72 of the zoning circuit 70, and by a "0" output signal from a flip-flop 184. Flip-flop 184 is initially reset by a clear pulse. Thus, the AND gate 182 is actuated to trigger the ramp generator 180 whenever a short vertical stroke is detected in any zone subsequent to the right zone. The AND gate 182 is deactivated when the flip-flop 184 is set. The flip-flop 184 is set by the activation of an AND gate 186. The AND gate 186 is acivated by the simultaneous coincidence of a short vertical stroke signal level from the flip-flop 72, the absence of a right zone signal $\overline{RZ}$ from the zoning circuit 70, and a timing pulse $TP_1$. The AND gate 186 is therefore activated at the end of the scan in which the ramp generator 180 is triggered and the activation thereof stops the ramp generator 180 from running. The ramp generator 180 therefore measures the distance from the point of detection of a vertical stroke in the center or left zones and until the end of the scanline in which it is detected. The output of the ramp generators 172 and 180 are applied to a comparator 188. If the ramp generator 172 exhibits a higher voltage than the ramp generator 180 because the generator 172 ran less than the generator 180, this signifies that the right stroke in the character is higher than the left stroke and the comparator produces an output signal. The output of the comparator 188 is applied as one input to an AND gate 190. The other inputs to the gate 190 are the outputs from the "1" terminal of the flip-flop 184 and a character presence signal (CP) from the character detector circuit 60 (FIGURE 3*a*). The activation of the AND gate 190 sets the flip-flop 192 to produce a right stroke higher (RSH)

signal from the "1" output terminal thereof. The flip-flop 192 is reset by a clear pulse at the end of scanning a character.

The character recognition circuits 40 also includes a start recognition cycle circuit 200 which is activated at the end of scanning a character to start the recognition of the character. The circuit 200 includes a flip-flop 202 which is set by a start recognition signal derived from the AND gate 68 in the character detector circuit 60 at the first complete white scan after a character. The flip-flop 202 is reset by a clear pulse. The "1" output terminal of the flip-flop 202 as well as the start scan pulse (SSP) derived from the video processing circuit 36 (FIGURE 1) are coupled to activate an AND gate 204 which produces a transfer signal when activated. The transfer signal is applied to a multivibrator 206 which triggers to produce an output clear pulse on the trailing edge of the transfer signal. The clear pulse is applied to reset the flip-flop 202 as well as provide a general reset pulse for the character recognition circuits 40. The transfer signal from the AND gate 204 is also applied to a decoder 210. The transfer signal activates the transfer of all of the feature signals (indicated in the table of FIGURE 4) stored in the various flip-flops of FIGURES 3*a* and 3*b* to apply these signals to the decoder 210. The decoder 210 which is a physical embodiment of Truth Table in FIGURE 4, may for example comprise a Christmas tree logic circuit. The decoder 210 decodes the various signals to provide an output denoting a recognized character. An encoder 220 is coupled to the decoder 210 to encode the output therefrom into a digitalized machine code.

Operation

In describing the operation of the character recognition system, it will be assumed that the numeral 5 in FIGURE 2 is being read. Initially, the various flip-flops in the reader are reset by a clear pulse generated at the end of the previous character. The clear pulse produces an $\overline{SVS}$ signal from the flip-flop 66 in the character detector 60 (FIGURE 3*a*) which signal sets the flip-flop in the first stage of the register 92 to produce a right zone signal. When the transport mechanism 12 moves the numeral 5 into the scanning area, the first scanline SC1 to traverse the character will intercept the vertical stroke in the lower righthand portion of the numeral 5 (FIGURE 2). When the scanline SC1 has traversed at least five elements into this vertical stroke (i.e., up to point $P_1$), the pulse width discriminator 56 (FIGURE 3*a*) detects the existence of a short vertical stroke and produces an SVS pulse output therefrom. The SVS pulse output from the discriminator 56 sets the flip-flop 66 in the character detector circuit (FIGURE 3*a*) and applies a second enabling signal to the AND gate 64. The first enabling signal is produced by the initial black video in this scanline setting the flip-flop 62. The short vertical stroke signal (SVS) from the discriminator 56 is also applied to the AND gates 130, 132 and 134 in the stroke storage circuit 110. The AND gate 130 is activated by this signal in view of the fact that the gate is enabled by the right zone (RZ) signal applied from the first stage of the register 92. The activation of the AND gate 130 sets the flip-flop 124 and stores a short vertical right (SVR) stroke signal. The short vertical stroke (SVS) signal from the discriminator 56 also sets the flip-flop 72 in the zoning circuit 70 producing an SVS level signal from the "1" terminal thereof. The SVS level signal is applied through the AND gate 174 to run the first ramp generator 172 (FIGURE 3*b*). The voltage output of the ramp generator 172 is initially a constant amount, for example +13 volts, and decreases toward zero depending upon the amount of time that the AND gate 174 is activated. The AND gate 174 is deactivated at the end of the scan SC1 by the timing pulse $TP_1$ setting the flip-flop 176. Consequently, the ramp generator 172 stores a voltage which is equivalent to the distance from the point $P_1$ in FIGURE 2 to the end of the scanline at 46. The ramp generator 172 holds at this reduced voltage.

During scanline two (SC2), not shown in FIGURE 2, a start scan pulse (SSP) resets the flip-flop 62 in the character detector circuit 60 and the black video signal from the lower outline trace of the numeral 5 sets this flip-flop. At the end of the scan a character presence signal (CP) is produced when the timing pulse $TP_2$ is applied to the AND gate 64. The character presence (CP) signal resets the flip-flop 72 in the zoning circuit 70. On the next scan SC3 no short vertical stroke signal is produced to reset the flip-flop 72. Consequently, at the end of this scan at time $TP_1$, the AND gate 82 is activated to set the flip-flop 88 and enable the AND gate 90. The gate 90 is activated at the end of scan SC3 by the CP signal produced at the time $TP_2$. The CP signal activates AND gate 90 to advance the "1" previously stored in the first stage of the register 92 to the second stage. The setting of the second stage flip-flop also sets the flip-flop 94 and produces a center zone (CZ) signal from the "1" terminal thereof. The fourth scan of the numeral 5 (SC4) (not shown in FIGURE 2) causes the AND gate 142 in the short white gap detector 140 to be activated when the lower horizontal stroke has been traversed. The activation of the AND gate 142 at the beginning of the white gap between the bottom and middle horizontal strokes of the numeral 5 causes the pulse width discriminator 144 to produce an output pulse after a delay of two elements or halfway between these two horizontal strokes. This pulse activates the AND gate 148. The triggerable flip-flop 146 is triggered to the reset state at the trailing edge of the output pulse. The AND gate 148 activates the one-shot multivibrator 152 to produce a pulse four elements long. The pulse produced by the multivibrator 152 activates the AND gate 158 when the middle horizontal stroke in the numeral 5 (FIGURE 2) is intercepted. When the gate 158 is deactivated at the end of the horizontal stroke, or at the end of the multivibrator pulse, the flip-flop 162 of the counter 160 is triggered to the set state. The crossing of the middle horizontal stroke activates the AND gate 142 which causes a pulse to be produced in the multivibrator 154. Conseqently, when the top horizontal stroke in the numeral 5 is traversed, the AND gate 158 is activated and triggers the flip-flop 162 to the reset state. The negative-going signal at the "1" output terminal of the flip-flop 162 triggers the flip-flop 164 to the set state. The setting of the flip-flop 164 indicates that a short white gap is detected. The AND gate 158 is disabled by the absence of a $\overline{SWG}$ signal.

During the time $TP_1$ of the fourth scan (SC4) (not shown in FIGURE 2), the AND gate 84 in the zoning circuit 70 is activated to set the flip-flop 88. Consequently, when a CP signal is produced at the time $TP_2$ at the end of this scan, a shift signal is applied from the AND gate 90 to shift the "1" from the second to the third stage of the register 92.

Each of the next two scans SC5 and SC6 in the center zone advances the "1" stored in the third stage to the fourth and fifth stages, respectively, of the register 92. When the "1" output terminal of the flip-flop in the fifth stage of the register 92 goes high, the AND gate 98 is activated because no vertical stroke is detected in the center zone of the numeral 5. The activation of the AND gate 98 resets the flip-flop 94 and activates the AND gate 104 to produce a left zone (LZ) signal.

In the scanline SC9 the upper lefthand vertical stroke is detected by the pulse width discriminator 56 at the point $P_2$ to produce an output signal therefrom. The AND gate 182 is therefore activated to drive the second ramp generator 180 in the comparator circuit 170 from its constant voltage level. The ramp 180 runs from the constant voltage, say 13 volts, and decreases toward zero during the time it takes for the scanline to traverse the distance between point $P_2$ and the limit 46 shown in FIGURE 2. When the scanline reaches the end of its scan, the flip-flop 184 is reset removing the enabling signal from the ramp generator 180. The setting of the flip-flop 184 enables the AND gate 190. However, the AND gate 190 is not activated because the comparator 188 does not produce an output signal. The comparator does not produce an output signal because the voltage output of the generator 180 is higher than the generator 172. Consequently, no setting of the flip-flop 192 occurs and the right stroke from the numeral 5 is detected as not being higher (i.e., $\overline{RSH}$) than the other vertical stroke in this character. The detection of the vertical stroke in the left zone also sets the flip-flop 128 in the stroke storage circuit 110.

In the scan SC11, no video signals are detected because the end of the character is reached. Thus, in scanning the character 5, three scans occurred in the right zone, three scans in the center zone and four scans in the left zone. In the eleventh scan the flip-flop 62 in the character detector 60 remains reset during the entire scan because no black video signals occur. At the end of this scan, the timing pulse $TP_1$ activates the AND gate 68 to produce a start recognition pulse. This pulse sets the flip-flop 202 in the start recognition cycle circuit 200 (FIGURE 3*b*). At the beginning of the next scan (SC12), the AND gate 204 is activated to produce a transfer signal which transfers all the feature signals detected into the decoder 210. The various signals detected from scanning the numeral 5 are shown in the Truth Table of FIGURE 4. These feature signals include the presence of short vertical right and left strokes and a short white gap, denoted by a + sign in FIGURE 4, and the absence of long vertical strokes in all zones as well as the absence of a right stroke higher signal, denoted by a — sign in FIGURE 4. These feature signals cause the decoder 210 to produce a signal identifying the character 5. Other characters are identified in the decoder by synthesizing the various feature signals shown in FIGURE 4. The trailing edge of the transfer signal triggers the multivibrator 206 in the start recognition cycle circuit 200 to produce a clear pulse to reset the recognition circuits 40 to recognize the next character scanned.

Thus, a character reader, in accordance with the invention, reads characters without the necessity of zoning from top to bottom or vice versa the character to determine in what zone a vertical stroke occurs. The character reader detects the size of the vertical strokes and their vertical position as well as the height of the right stroke in relation to the remaining strokes in the character. Consequently, the character reader avoids the problem of carefully synchronizing the scanlines with the recognition circuits and provides an inexpensive method of reading numerals from a matchstick type font.

What is claimed is:

1. In a character reader for reading characters, said characters having outline traces formed of one or more distinctive features including horizontal and vertical strokes, said character reader including a scanner for scanning each of said characters by a plurality of scanlines to produce video signals that include pulses wherever the outline traces of said character are intercepted, the combination comprising, character detector means coupled to said scanner for detecting video signals derived from scanning a character, stroke detector means coupled to said character detector means for detecting vertical strokes by producing a detection signal upon receipt of a vertical stroke video signal derived from scanning a vertical stroke in said character, said vertical stroke video signal exhibiting a predetermined duration substantially greater than a video signal derived from scanning a horizontal stroke in said character, first means coupled to said stroke detector means for generating a first analog signal having a characteristic that corresponds to a measure of the distance between a predetermined point in a scanline and the point of detection of a first vertical stroke of said character detected in said scanline, second means coupled to said stroke detector means for generating in a subsequent scanline of said character a second analog signal having a characteristic that corresponds to a measure of the distance between said predetermined point and the point of detection of a second vertical stroke of said character detected in said subsequent scanline, a comparator coupled to said first and second means for comparing said first and second analog signals to determine which of said first and second vertical strokes is higher, and means for signalling when one of said vertical strokes is higher than the other.

2. A character reader in accordance with claim 1 wherein said first and second means comprises first and second ramp generators coupled to said stroke detector means to be activated upon the detection of vertical strokes and deactivated at said predetermined point in said scanlines.

3. A character reader in accordance with claim 1 that further includes, means coupled to said scanner for measuring the white gap between horizontal strokes in a character.

4. A character reader in accordance with claim 1 wherein said stroke detector means includes a pair of pulse width discriminators for detecting and separating the short vertical strokes from long vertical strokes based on the duration of pulses in said video signals.

5. A character reader in accordance with claim 4 that further includes, a zoning circuit for effectively dividing said character into a plurality of vertical zones.

6. A character reader in accordance with claim 5 that further includes, means coupled to said zoning circuit and said pulse width discriminator for indicating the vertical zones of a character in which said long and short vertical strokes are detected.

References Cited

UNITED STATES PATENTS

| | | | |
|---|---|---|---|
| 2,956,264 | 10/1960 | Rohland | 340—149 |
| 3,072,886 | 1/1963 | Greanias et al. | 340—146.3 |
| 3,245,037 | 4/1966 | Brust et al. | 340—146.3 |
| 3,300,757 | 1/1967 | Beltz | 340—146.3 |
| 3,142,818 | 7/1964 | Holt | 340—146.3 |
| 3,193,799 | 7/1965 | Holt | 340—146.3 |
| 3,346,845 | 10/1967 | Fomenko | 340—146.3 |
| 3,348,200 | 10/1967 | Ross | 340—146.3 |

MAYNARD R. WILBUR, Primary Examiner

R. F. GNUSE, Assistant Examiner